Jan. 15, 1952     W. McCASKIE     2,582,597

REEL

Filed Jan. 15, 1949

INVENTOR.

William McCaskie

BY Barlow & Barlow

Attorneys

Patented Jan. 15, 1952

2,582,597

UNITED STATES PATENT OFFICE 2,582,597

REEL

William McCaskie, New Bedford, Mass., assignor to William McCaskie, Inc., a corporation of Massachusetts Application January 15, 1949, Serial No. 71,161

3 Claims. (Cl. 242—118)

1

This invention relates to a reel upon which wire or the like may be wound for shipping or storage.

Heretofore, reels of this general type have been made of wood and reenforced in various ways to strengthen the same against breaking when dropped or subjected to substantial stress or strain.

One of the objects of this invention is to provide a reenforcement for the head of the reel which may be formed of a laminated construction so that the head will be strengthened and will withstand a greater amount of abuse than constructions heretofore provided.

Another object of this invention is to provide a band or tire about the peripheral edge of the head to lock the two parts of the head together and provide a somewhat resilient structure which will absorb shock.

Another object of this invention is to provide a tire which may be positioned on the head after the plies of the head are in assembled relation.

With these and other objects in view, the invention consists of certain novel features of construction, as will be more fully described and particularly pointed out in the appended claims.

In the accompanying drawings:

Figure 1 is an end view of a reel constructed in accordance with this invention;

Figure 2 is a partial sectional view taken substantially on line 2—2 of Figure 1; and Figure 3 is a perspective view of the tire or band alone in the form which it assumes when on the head.

In proceeding with this invention, I provide a barrel with heads at each end each formed of two pieces of material and then place a band or tire around the outer edge of each of the heads with the tire provided with outwardly extending ribs which will reenforce the tire and provide sufficient resiliency so that shock may be absorbed by the resiliency of this tire and dampened as it is transmitted to the wooden head.

With reference to the drawings, 10 designates a barrel portion which is provided with heads 11 and 12 which are of substantially duplicate construction. These heads are held onto the barrel by means of tie bolts 13, the heads 14 of which are positioned in recesses 15 reenforced as at 16 with the nuts 17 similarly positioned on the threaded end of the bolt 13 in recesses in the other head.

Each of the heads 11 and 12 is provided of two plies of wood, the outer ply being formed of several pieces 20 with their grain extending

2 in one direction, while the inner ply 21 is formed of several pieces with the grain extending at right angles to the grain of the pieces in the ply 20. In order to lock the plies 20 and 21 of each of the heads together at their outer peripheral edges, I provide annular notches 22 on the outer surface and 23 on the inner surface of each head and extend a band designated generally 25 about the peripheral edge.

This band 25 is of uniform thickness and has two raised ribs 26 and 27 which extend radially outwardly from the surface of the band which contacts the outer edge of the head leaving hollow voids on the inner surface, while the band is rolled inwardly as at 28 into the outer notch 22 and inwardly as at 29 into the inner notch 23 so as to cause the band to snugly embrace the head and bind the two plies of wooden material 20 and 21 together and at the same time secure the band in position around the peripheral edge.

The projections on the band 26 and 27 being spaced from the edge of the head give a certain resilient action to the band when struck so that the band will have some elasticity and will absorb considerable shock which would otherwise be transmitted to the wooden heads. A groove 30 is also provided between the two raised ribs 26 and 27 so that a flexible element might be used about the tire if desired either as a drive or a brake therefor.

I claim:

1. A reel comprising a barrel having non-metallic heads at the ends thereof, said heads each having a narrow metal band serving as a reinforcing tire about the peripheral edge thereof said band being flat with flanges clamped to the inner and outer faces of the head, said band being outwardly deflected from said flat surface between said flanges to provide a radially extending rib spaced from the edge of the head.

2. A reel as in claim 1 wherein there are a plurality of outwardly deflected radially extending ribs.

3. A reel as in claim 1 wherein said heads are recessed on their faces and said flanges are in said recesses.

WILLIAM McCASKIE.

REFERENCES CITED

The following references are of record in the file of this patent:

UNITED STATES PATENTS

| Number | Name | Date |
|---|---|---|
| 1,852,243 | Hubbard | Apr. 5, 1932 |